June 29, 1954  R. K. CHAMBERLAIN ET AL  2,682,320
SINGLE DISK LIQUID COOLED BRAKE
Filed Sept. 15, 1951  2 Sheets-Sheet 1
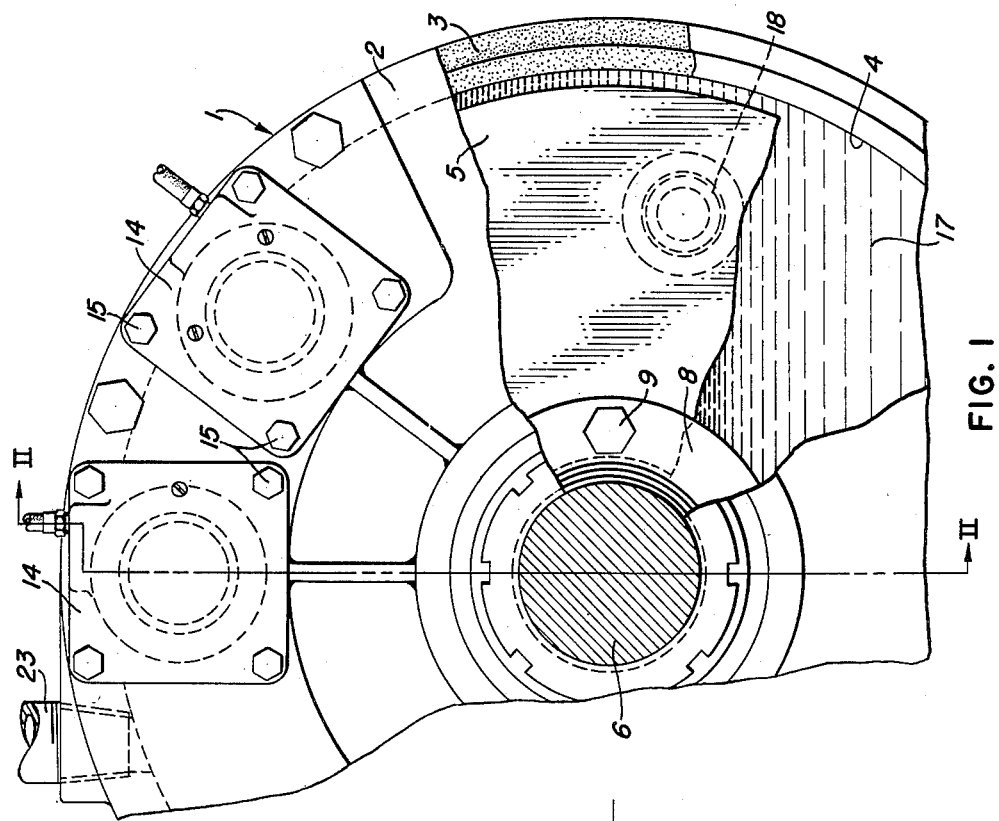
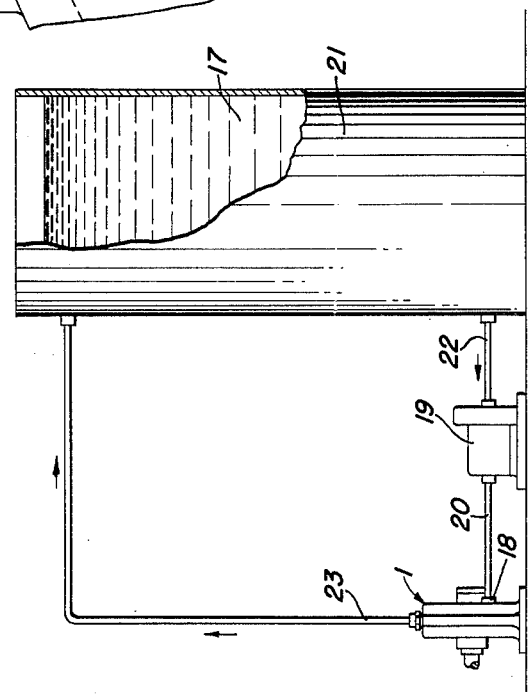
INVENTORS
RICHARD K. CHAMBERLAIN
DONALD D. NEFF
BY
*R. L. Miller*
ATTORNEY INVENTORS
RICHARD K. CHAMBERLAIN
DONALD D. NEFF
BY
R. L. Miller
ATTORNEY

UNITED STATES PATENT OFFICE 2,682,320

SINGLE DISK LIQUID COOLED BRAKE

Richard K. Chamberlain, Akron, and Donald D. Neff, Uniontown, Ohio, assignors, by mesne assignments, to The Goodyear Tire & Rubber Company, a corporation of Ohio Application September 15, 1951, Serial No. 246,772

1 Claim. (Cl. 188—264)

This invention relates to brakes, especially to a single disc liquid cooled brake adapted for use on a stationary article.

Heretofore many different types of brakes have been constructed for use in different types of braking operations. The present invention relates primarily to brakes of the class used in connection with stationary apparatus that has heavy moving components, such as oil well drilling apparatus.

The general object of the present invention is to provide an effective compact brake of the class described characterized by the novel use of a liquid in cooling the brake disc and lining means of the brake.

Another object of the invention is to use a pump in a brake system for circulating cooling liquid through the brake.

Another object of the invention is to provide a brake wherein a cooling liquid directly contacts the brake disc and the brake lining means used to cool same.

Yet another object of the invention is to force desired amounts of liquid through a brake to cool same.

The foregoing and other objects and advantages of the invention will be made more apparent as the specification proceeds.

Reference now is directed to the structure shown in the attached drawing wherein one embodiment of the principles of the invention is shown, and wherein:

Fig. 1 is a fragmentary elevation of a brake of the invention with parts of the brake broken away to show the interior construction of the brake;

Fig. 3 is an elevation of the brake of the invention and the liquid supply and control means used in combination therewith.

Figure 2:
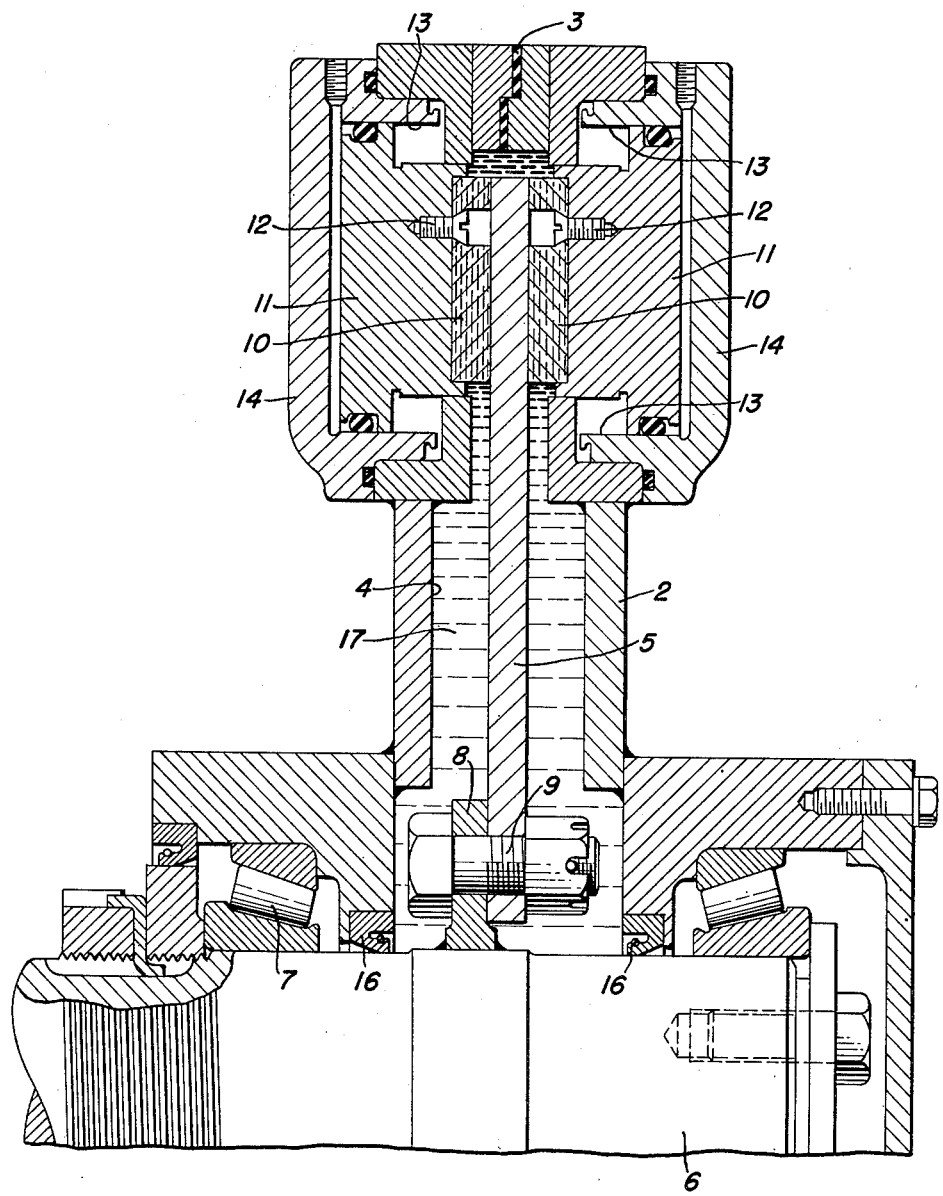
Fig. 2 is a vertical section on lines II—II of Fig. 1.

The present invention comprises the combination of a special brake with means for forcing flow of a liquid, usually water, through the brake and comprises a brake housing defining a closed chamber, a shaft journalled in the brake housing, a brake disc carried by said shaft and positioned thereby in said chamber, brake linings positioned for engagement with said brake disc, liquid inlet and liquid outlet means in spaced parts of said brake housing communicating with said chamber, and means for forcing flow of liquid into and through said chamber.

Attention now is directed to the details of the construction shown in the drawings, and a brake is indicated as a whole by the numeral 1. The brake 1 includes a brake housing 2 that usually is made from a plurality of parts that are welded or otherwise secured together and which is shown in two mating sections secured together with a gasket 3 therebetween. The brake housing 2 defines a closed chamber 4 in which a brake disc 5 is positioned by a shaft 6. The shaft 6 is suitably journalled in the brake housing as by the bearings 7 shown in Fig. 2. The brake disc 5 may be secured to the shaft 6 by a rib 8 on the shaft, which rib 8 may have the brake disc 5 bolted thereto by bolts 9.

Any desired type of braking means may be used in the brake 1 and it is shown as including a plurality of opposed circular block type of brake linings 10. These brake linings 10 are individually secured to control pistons 11 by screws 12. The control pistons are slidably positioned in bores or recesses 13 in carrier plates 14 suitably secured to the brake housing 2 in opposed relation by cap screws 15 or similar means. The brake linings 10 thus are positioned for engaging desired circumferential portions of the brake disc 5 in opposed relation.

Preferably hydraulic fluid is used to operate or actuate the braking means used and such fluid may be supplied from and controlled by a suitable piston and cylinder (not shown) that connects to the axially outer portions of the bores 13 by conventional conduits and fittings (not shown) so that the control pistons 11 and brake linings 10 can be forced in towards the brake disc 5 for braking action. Conventional seal means are used to seal the control pistons 11 in the bores 13, and the carrier plates 14 to the brake housing 2 to aid in sealing the chamber 4. The shaft 6 likewise is sealed with relation to the chamber 4 by seal rings 16.

Fig. 2 shows that the brake linings 10 protrude into the chamber 4 for contacting the brake disc 5. Peripheral portions of the control pistons 11 on the inner surfaces thereof are exposed in the chamber 4 and contact liquid in such chamber. Thus pressure exerted on such liquid is transmitted thereby to the control pistons to move them to inoperative positions when they are not actuated. It will be noted that the control pistons 11 and the positioning and operating means therefor comprise fluid motors, which are used to produce the desired braking action in the apparatus of the invention.

A liquid, usually water, 17 is received in the chamber 4 and normally completely fills the chamber. This liquid usually is supplied to the brake housing 2 and chamber 4 by an inlet fitting 18 ordinarily in the lower part of the brake housing 2 and connected to and receiving liquid from a pump 19 by a conduit 20 (Fig. 3). The pump 19 may obtain liquid from a storage tank 21 by a conduit 22. Liquid in the brake housing 2 is exhausted through an outlet conduit 23 that connects to the storage tank 21.

It will be appreciated that the pump 19 can force liquid through the brake housing at any desired rate. In some instances, it is desirable to have some of the liquid passing through the chamber 4 be evaporated due to the large amount of heat energy absorbed by the liquid in such action.

An important feature of the invention resides in the direct contact of the liquid 17 with the brake linings 10. Such contact avoids the insulation effect of air spaces between the brake linings and coolant means as exists in many other liquid cooled brakes.

Any size storage tank 21 may be used and the liquid 17 therein could be refrigerated, if desired, so that the liquid returned to the brake housing 2 will be at a suitable low temperature. Suitable liquids other than water can be used when desired.

Any number of units of the spot pressure type of brake shown may be provided so that they extend over a desired circumferential portion of the brake disc 5.

It will be understood that a suitable condenser may be provided in the liquid circulation path, or fresh liquid may be supplied to the brake housing 2 from any suitable supply and pressure source, as desired.

From the foregoing, it will be seen that the brake of the invention has a positive, controllable cooling action exerted thereon. This action is achieved by compact efficient means so that the objects of the invention are thought to be achieved.

While a certain representative embodiment and details have been shown for the purpose of illustrating the invention, it will be apparent to those skilled in this art that various changes and modifications may be made therein without departure from the spirit or scope of the invention.

What we claim is:

In a brake, a brake housing defining a closed chamber, a shaft journalled in said brake housing, a disc immovably secured to said shaft and positioned in the chamber in said brake housing, a pair of fluid motors each of which includes a substantially circular piston extending therefrom carried by said brake housing on opposite sides thereof, and substantially circular brake block means individually carried by each of said pistons, said fluid motors being operable to clamp said disc between said brake block means on brake operation, cooling liquid being present in the chamber in said brake housing in contact with said disc, said piston and brake block means being circumferentially spaced from any adjacent pistons and brake block means to permit radial flow of cooling liquid therebetween.

References Cited in the file of this patent

UNITED STATES PATENTS

| Number | Name | Date |
|---|---|---|
| 854,720 | Dawson | May 28, 1907 |
| 1,217,591 | Goldmerstein | Feb. 27, 1917 |
| 2,373,572 | Lambert | Apr. 10, 1945 |
| 2,400,225 | Eksergian | May 14, 1946 |
| 2,407,699 | Hill | Sept. 17, 1946 |
| 2,518,016 | Johnson et al. | Aug. 8, 1950 |

FOREIGN PATENTS

| Number | Country | Date |
|---|---|---|
| 243,557 | Germany | Feb. 16, 1912 |
| 579,061 | Germany | June 21, 1933 |